United States Patent [19]
Inoue et al.

[11] Patent Number: 6,146,733
[45] Date of Patent: *Nov. 14, 2000

[54] OPTICAL RECORDING MEDIUM

[75] Inventors: Hiroyasu Inoue; Tatsuya Kato; Hajime Utsunomiya, all of Nagano, Japan

[73] Assignee: TDK Corporation, Tokyo, Japan

[*] Notice: This patent is subject to a terminal disclaimer.

[21] Appl. No.: 09/212,866

[22] Filed: Dec. 17, 1998

[30] Foreign Application Priority Data

Dec. 18, 1997 [JP] Japan .................................... 9-364541
Nov. 17, 1998 [JP] Japan ................................... 10-343616

[51] Int. Cl.$^7$ ..................................................... B32B 3/02
[52] U.S. Cl. ...................... 428/64.1; 428/64.2; 428/64.4; 428/64.5; 428/64.6; 428/457; 428/913; 430/270.13; 430/495.1; 430/941; 369/283; 369/288
[58] Field of Search .................................. 428/64.1, 64.2, 428/64.4, 64.5, 64.6, 457, 913; 430/270.13, 495.1, 945; 369/283, 288

[56] References Cited

U.S. PATENT DOCUMENTS 5,978,349 11/1999 Yoshinari .............................. 369/275.1

Primary Examiner—Elizabeth Evans
Attorney, Agent, or Firm—Oblon, Spivak, McClelland, Maier & Neustadt, P.C.

[57] ABSTRACT

A phase change type optical recording medium comprises a dielectric layer $1a$, a dielectric layer $1b$, a phase change type recording layer and a second dielectric layer in the described order. The recording layer satisfies $Ac/Aa \geq 0.8$ where Ac is an absorption coefficient of the recording layer in a crystalline region and Aa is an absorption coefficient of the recording layer in an amorphous region. The dielectric layer $1a$ comprises $ZnS$—$SiO_2$ as main components and the dielectric layer $1b$ comprises a metal nitride or $ZnS$—$SiO_2$ having an $SiO_2$ content of 40 to 80 mol % as main components. At least an area of the second dielectric layer that is in contact with the recording layer comprises a metal nitride, a rare earth oxide, silicon oxide or $ZnS$—$SiO_2$ having an $SiO_2$ content of at least 40 mol% as main components. However, an optical recording medium comprising a dielectric layer $1a$ having an $SiO_2$ content of 2 mol % to less than 40 mol % and a second dielectric layer having an $SiO_2$ content of 40 to 80 mol % is precluded from the invention.

7 Claims, 1 Drawing Sheet

OPTICAL RECORDING MEDIUM

BACKGROUND OF THE INVENTION

The present invention relates to a phase change type optical recording medium.

Highlight is recently focused on optical recording media capable of recording information at a high density and erasing the recorded information for rewriting. One typical rewritable optical recording medium is of the phase change type wherein the recording layer is irradiated with a laser beam to change its crystallographic state whereupon a change of reflectance by the crystallographic change is detected for reading. Optical recording media of the phase change type are of great interest since the optical system of the driving unit used for their operation is simpler than that for magneto-optical recording media.

Most optical recording media of the phase change type use Ge—Sb—Te base or chalcogenide materials which provide a substantial difference in reflectance between crystalline and amorphous states and have a relatively stable amorphous state.

When information is recorded on a phase change type optical recording medium, the recording layer is irradiated with a laser beam of power (recording power) high enough to bring the recording layer to a temperature higher than the melting point thereof. The recording layer is melted at spots with the recording power applied thereon, and then quickly cooled so that recorded marks of amorphous nature can be formed. When the recorded marks are erased, on the other hand, the recording layer is irradiated with a laser beam having such a relatively low power (erase power) as to bring the recording layer to a temperature higher than the crystallization temperature thereof but lower than the melting point thereof. The recorded marks with the erase power applied thereon go back to the amorphous state because they are slowly cooled down after heated to the temperature higher than their crystallization temperature. With the phase change type optical recording medium, it is thus possible to modulate the intensity of a single light beam for overwriting.

With a phase change type optical recording medium comprising a recording layer constructed of a Ge—Sb—Te base material and dielectric layers provided on both sides thereof, each composed mainly of ZnS, however, the number of overwritable cycles is limited to several thousand cycles or so because of increased jitters and bit error rates due to repetition of overwriting. A possible leading reason for the increased jitters and bit error rates due to repetition of overwriting could be a composition change of the recording layer caused as by the diffusion of elements between the recording layer and the dielectric layers adjacent thereto.

For instance, JP-A 2-64937 discloses one approach to improving the number of overwritable cycles. The publication describes that repetitive recording performance can be improved by providing one or both sides of a recording layer with a heat-resistance protective layer or layers, and providing at least one of the heat-resistant protective layer with a protective layer having a volume modulus smaller than that of the heat-resistant protective layer. The publication refers to $MoS_2$, ZnS, ZnSe, etc. as the material that forms the protective layer having a small volume modulus, and to silicon carbide, silicon nitride, and aluminum oxide as the material that forms the heat-resistant protective layer. Further, Example 2 therein teaches that $SiN_x$ layers, each of 20 nm in thickness, are formed on both sides of a recording layer of 100 nm in thickness, and the recording layer is provided on its laser beam-striking side with ZnS at a thickness of 100 nm and on the opposite side with ZnS at a thickness of 200 nm. The publication then alleges that this arrangement shows repetitive recording performance high enough to ensure scores of thousands recording cycles.

Referring here to a prior art phase change type optical recording medium, it has a general structure wherein a recording layer sandwiched between dielectric layers is provided on a substrate, and a metal reflective layer is provided on the upper dielectric layer. In the medium of this structure, however, the absorptance of the recording layer is generally higher in an amorphous state than in a crystallographic state. A problem with this is that the size of recorded marks formed upon overwriting is distorted under the influences of the crystallographic state before recording, resulting in an increase in the jitters.

To reduce such jitters, JP-A 8-124218 proposes an optical information recording medium comprising a substrate and a multilayer structure provided thereon, which comprises, in order from the substrate, a first dielectric layer, a recording layer, a second dielectric layer, a reflective layer, a third dielectric layer and an ultraviolet-curing resin layer, wherein:

Ac>Aa where Ac is a light absorption of said recording layer in a crystalline region and Aa is a light absorption of said recording layer in an amorphous region, a transmitting, extremely thin metal film, Si or Ge is used for said reflective layer, and a dielectric material having a refractive index of greater than 1.5 is used for said third dielectric layer. By the provision of the light-transmitting reflective layer and the third dielectric layer having a high refractive index, it is possible that Ac>Aa while the reflectance difference between the crystallographic state and the amorphous state is kept large. In the present disclosure, a structure where the difference between Ac and Aa is small or Ac>Aa will be called an absorption coefficient control structure.

Even with the absorption coefficient control structure, however, the jitters are found to increase due to repetitive overwriting.

One object of the invention is to provide a phase change type optical recording medium using a recording material based on a Ge—Sb—Te or other system, wherein the number of overwritable cycles is significantly increased.

SUMMARY OF THE INVENTION

Such an object is achieved by the inventions defined below as (1) to (7).

(1) An optical recording medium comprising a phase change type recording layer, a first dielectric layer that is in contact with a lower side of said recording layer and a second dielectric layer that is in contact with an upper side of said recording layer, in which:

Ac/Aa≧0.8 wherein upon incidence of a recording/reproducing laser beam from said first dielectric layer on said recording layer, Ac is an absorption coefficient of said recording layer in a crystalline region and Aa is an absorption coefficient of said recording layer in an amorphous region, and said first dielectric layer comprises a dielectric layer 1a that is spaced away from said recording layer and a dielectric layer 1b that is in contact with said recording layer, said dielectric layer 1a comprising zinc sulfide and silicon oxide as main components, said dielectric layer 1b comprising a metal nitride or zinc sulfide and silicon oxide as main components, with the proviso that when said dielectric layer 1b comprises zinc sulfide and silicon oxide as said main components, said dielectric layer 1b has a silicon oxide content of 40 to 80 mol % as found by [$SiO_2/(ZnS+SiO_2)$] provided that zinc sulfide and silicon oxide are calculated as ZnS and $SiO_2$, respectively, and an area of said second dielectric layer that is in contact with said recording layer comprising a metal nitride, a rare earth oxide, silicon oxide, or zinc sulfide and silicon oxide as main components, with the proviso that when said area comprises zinc sulfide and silicon oxide as said main components, said area has a silicon oxide content of at least 40 mol % as found by [$SiO_2/(ZnS+SiO_2)$] provided that zinc sulfide and silicon oxide are calculated as ZnS and $SiO_2$, respectively, with the proviso that precluded from said optical recording medium is an optical recording medium wherein:

said first dielectric layer, and said second dielectric layer comprises zinc sulfide and silicon oxide as main components, said dielectric layer 1a has a silicon oxide content of 2 mol % to less than 40 mol %, said dielectric layer 1b has a silicon oxide content of 40 to 80 mol % inclusive, said second dielectric layer has a silicon oxide content of 40 to 80 mol % inclusive, and said second dielectric layer has a thickness of 10 to 35 nm.

(2) The optical recording medium according to (1), wherein at least one of said area of said second dielectric layer that is in contact with said recording layer and said dielectric layer 1b comprises germanium nitride and/or silicon nitride as said main components.

(3) The optical recording medium according to (2), wherein said dielectric layer 1b comprises germanium nitride as a main component, and has a thickness of 0.5 to 40 nm inclusive.

(4) The optical recording medium according to (2), wherein said dielectric layer 1b comprises silicon nitride, and has a thickness of 0.5 nm to less than 5 nm.

(5) The optical recording medium according to any one of (1) to (4), wherein said dielectric layer 1a has a silicon oxide content of 2 mol % to less than 40 mol % as found by [$SiO_2/(ZnS+SiO_2)$] provided that zinc sulfide and silicon oxide are calculated as ZnS and $SiO_2$, respectively.

(6) The optical recording medium according to any one of (1) to (5), wherein said second dielectric layer has a reflective layer thereon, said reflective layer comprising a metal and having a thickness of up to 40 nm or comprising silicon or germanium and having a thickness of at most 80 nm.

(7) The optical recording medium according to (6), wherein said reflective layer has said third dielectric layer thereon.

BRIEF DESCRIPTION OF THE DRAWINGS

The aforesaid and other objects, features, and advantages of the invention will be better understood from the following description taken in conjunction with the accompanying drawings.

DETAILED DESCRIPTION OF THE INVENTION

Figure 1:
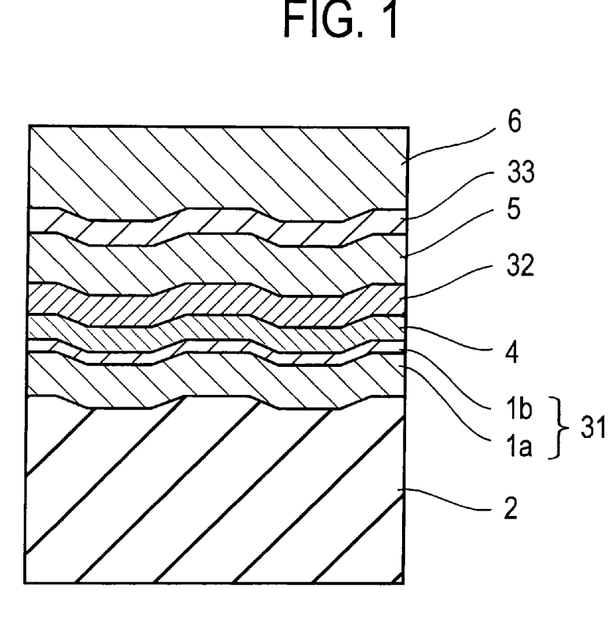
FIG. 1 is a partial cross-sectional view of one embodiment of the optical recording medium according to the invention.

One embodiment of the optical recording medium according to the invention is shown in FIG. 1. As shown, the optical recording medium comprises a substrate 2, and a first dielectric layer 31, a phase change type recording layer 4 and a second dielectric layer 32 provided thereon. The first dielectric layer 31 comprises a dielectric layer 1 on the side of the substrate 2 and a dielectric layer 1b on the side of the recording layer 4.

The dielectric layer 1a comprises zinc sulfide and silicon oxide (that will hereinafter be often referred to as ZnS—$SiO_2$) as main components, and the dielectric layer 1b comprises a metal nitride, or ZnS—$SiO_2$ having a relatively high $SiO_2$ content as a main component. This arrangement can reduce the increase in the jitters due to the repetition of overwriting, so that the number of overwritable cycles can be significantly increased.

The increase in the number of overwritable cycles according to the present invention could be achieved by the following action.

As already mentioned in conjunction with the prior art, the leading reason for the increased jitters and bit error rates due to repetition of overwriting could be a composition change of the recording layer caused as by the diffusion of elements from the dielectric layers to the recording layer due to heating for recording. In particular, Zn, and S diffused from the zinc sulfide-containing dielectric layer have an adverse influence on the recording layer. To increase the number of overwritable cycles, it is thus effective to locate between the zinc sulfide-containing dielectric layer and the recording layer a barrier layer for inhibiting the diffusion of Zn, and S.

In the first dielectric layer 31 according to the invention, the above dielectric layer 1b is located contiguous to the recording layer 4, so that the composition change of the recording layer due to the diffusion of Zn, and S from the dielectric layer 1a having a high ZnS content can be inhibited, thereby reducing the increased jitters and error bit rates due to repetition of overwriting. Since at least the area of the second dielectric layer 32 that is contiguous to the recording layer 4 comprises a metal nitride, a rare earth oxide, silicon oxide, or ZnS—$SiO_2$ having a relatively high $SiO_2$ as a main component, it is also possible to prevent diffusion of elements having an adverse influence on the recording layer 4 from the second dielectric layer 32.

Incidentally, the above JP-A 2-64937 discloses that dielectric layers are formed in the same manner as in the invention, but is silent about any medium of the absorption coefficient control structure. Example 2 therein teaches that $SiN_x$ layers, each of 20 nm in thickness, are provided on both sides of a recording layer, together with ZnS layers. However, the thickness of each SiNx layer deviates largely from the upper limit of the preferable thickness range of the dielectric layer 1b when it is made up of silicon nitride according to the present invention. Inventors' studies have showed that when too thick an $SiN_x$ layer is provided between a substrate and a recording layer, it exfoliates during storage in a high temperature and humidity environment.

On the other hand, JP-A 6-195747 discloses an optical disk comprising, in order from a substrate, a ZnS—$SiO_2$ layer, an $Si_3N_4$ layer, a recording layer, a ZnS—$SiO_2$ layer and a reflective layer stacked thereon. This optical disk is the same as that according to the invention in that the $Si_3N_4$ layer is provided between the recording layer and the ZnS—$SiO_2$ layer located on the substrate side. However, the publication discloses nothing about the $SiO_2$ content of the ZnS—$SiO_2$ layer located between the substrate and the $Si_3N_4$ layer, and the ZnS—$SiO_2$ layer located between the recording layer and the reflective layer. Nor does the publication show any medium of the absorption coefficient control structure. The object of the invention set forth therein is to provide an optical disk undergoing no erasability drop even when it is used with a short wavelength light source or rotated at high speed, and so is quite different from the object of the present invention. The invention of the publication uses the $Si_3N_4$ layer as the layer to accelerate the crystallization of the recording layer, thereby accomplishing the above object. However, the publication is entirely silent about the thickness of the $Si_3N_4$ layer, and fails to disclose that germanium nitride may be used in place of $Si_3N_4$.

The object of the present invention is to provide a medium of the absorption coefficient control structure wherein the number of overwritable cycles is significantly increased. To accomplish this object, specific limitations are imposed on the $SiO_2$ content of the $ZnS$—$SiO_2$ layer (dielectric layer 1a) located between the dielectric layer 1b comprising the nitride and the substrate, and the $ZnS$—$SiO_2$ layer provided on, and in contact with, the recording layer. In a preferred embodiment of the invention wherein the dielectric layer 1b comprises silicon nitride as a main component, the dielectric layer 1b is limited to the optimum thickness. Inventors' studies have showed that the $Si_3N_4$ layer exfoliates during storage in a high temperature and humidity environment because its preferable thickness used for the acceleration of crystallization exceeds the upper limit of the thickness range defined herein. It has also been found that some difficulty is involved in obtaining high C/N ratios because the $ZnS$-$SiO_2$ layer located between the silicon nitride layer and the substrate becomes relatively thin.

JP-A 4-52188 discloses a phase change type optical recording medium having a transparent substrate and comprising, in order from the substrate, a first protective layer, a recording thin film, a second protective layer and a reflective layer. In this medium, the recording thin film based on Te-Ge-Sb is provided on at least one surface with a nitride layer comprising GeN and the first, and second protective layers are each composed of $ZnS$—$SiO_2$. In these respects, the medium is the same as that disclosed herein.

However, the publication discloses nothing about any medium of the absorption coefficient control structure. The object of the invention set forth therein is to incorporate nitrogen in the recording thin film by melting the nitride layer for mixing with the recording thin film in the process of initializing the recording thin film to crystallize the entire surface thereof. The incorporation of nitrogen in the recording thin film is to prevent migration of the recording thin film material along guide grooves in the substrate by pulsation of the protective layers in association with repetition of recording and erasing. Consequently, when information is recorded on the medium set forth in the publication or the recorded information is erased therefrom after initialization, the nitride layer ceases to exist or varies strikingly in composition, if present. Thus, the nitride layer is not equivalent in effect to the dielectric layer 1b according to the invention. In other words, the nitride layer fails to act as the barrier layer for preventing diffusion of Zn, and S. The recording thin film comprises coarse grains which are larger in grain size than 150 nm upon initialization by melting, and then become finer and finer due to the repetition of recording and erasing. Stated otherwise, the migration of atoms occurs due to the repetition of recording and erasing. This in turn renders it impossible to obtain any stable performance due to segregation of the recording thin film upon subjected to repetitive recording and erasing cycles. According to the invention, however, the dielectric layer 1b cannot lose its barrier layer function because the recording layer is crystallized for initialization in a solid phase state. In addition, stable recording and erasing are feasible because the grain size of the recording layer after the solid-phase initialization is about 20 to 150 nm or approximate to that after subjected to repetitive recording and erasing cycles.

One example given in the publication shows that the content of $SiO_2$ in the second protective layer is 20 mol %. In this regard, too, the invention set forth therein is distinguishable from the present invention. With an optical recording medium actually fabricated in the example therein, therefore, the effect of the present invention is not achievable even when the nitride layer exists after the initialization by melting.

Some preferred embodiments of the invention will now be explained in great detail.

The optical recording medium of the invention is of the aforesaid absorption coefficient control structure. More specifically, the optical recording medium of the invention should satisfy:

$$Ac/Aa \geq 0.8$$

Here Ac is an absorption coefficient of the recording layer in a crystalline region and Aa is an absorption coefficient of the recording layer in an amorphous region, as measured at the wavelength of a recording/reproducing laser beam.

Preferably in this case, $Ac/Aa \geq 0.9$. In view of the influence of latent heat, it is more preferable that $Ac/Aa \geq 1$, and it is even more preferable that $Ac/Aa > 1$. Ac, and Aa may be calculated from the optical constant of each of the layers forming the medium and the wavelength of the recording/reproducing laser beam.

In the structure wherein Ac/Aa is controlled to the above range, usually, a recording/reproducing laser beam strikes on the lower side of a transparent substrate, and then transmits through the substrate, leaving a reflective layer side. The transmittance in this case, i.e., the ratio of the transmitted light with respect to the incident light is at least about 1%, and usually at least about 3%. It is here to be noted that this transmittance is a value as measured in a state where only inorganic layers are present on the transparent substrate. Stated otherwise, by this "transmittance" is intended an transmittance resulting from multiple reflection of light between the inorganic layers such as recording, dielectric, and reflective layers in the arrangement in FIG. 1, from which the protective layer 6 is removed. The transmittance may be measured by means of a spectrophotometer. The transmittance of any desired area inclusive of a crystalline region and an amorphous region may be measured. Usually, however, the transmittance of a groove-free crystalline area (a mirror region) may be measured.

Figure 2:
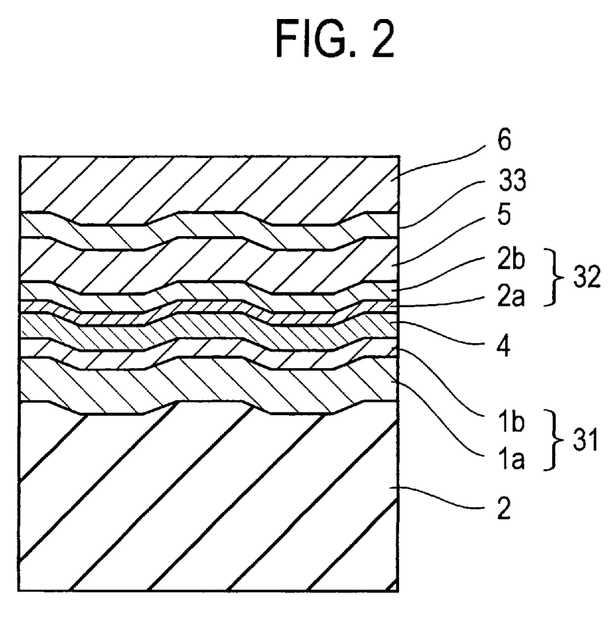
FIG. 2 is a partial cross-sectional view of another embodiment of the optical recording medium according to the invention.

Illustrative embodiments of the optical recording medium according to the invention are shown in FIGS. 1, and 2, respectively. Each optical recording medium is a single-sided recording (single-substrate) type medium having a substrate 2 and comprising, in order from a surface side thereof, a first dielectric layer 31, a recording layer 4, a second dielectric layer 32, a reflective layer 5, a third dielectric layer 33 and a protective layer 6 provided thereon. It is here to be noted that the present invention may be applied to a double-sided recording type medium comprising two such single-sided recording type media bonded together at protective layers 6, using adhesive layers. Also, the present invention may be applied to a medium with the above single-sided recording type medium bonded to a protective substrate, using an adhesive layer.

SUBSTRATE

In the optical recording medium of the invention, the recording layer 4 is irradiated through the first dielectric layer 31 with a light beam. It is therefore preferable that the substrate 2 is made up of a material substantially transparent to the light beam used, for instance, a resin or glass material. For the resin, it is preferable to use acrylic resin, polycarbonate, epoxy resin, polyolefin or the like. The shape and size of the substrate are not critical to the practice of the present invention, although the substrate is generally of disk shape having a thickness of about 0.5 to 3 mm and a diameter of about 50 to 360 mm. If required, the substrate may be provided on its surface with a grooved or other shaped pattern for tracking, and addressing purposes.

The optical recording medium of the invention is particularly suitable for high-density recording, and more particularly suitable for a (land-groove recording type of) construction wherein both grooves and lands are used as recording tracks. Preferably in this case, the recording tracks have a pitch of usually about 0.3 to 1.0 μm.

First Dielectric Layer 31 and Second Dielectric Layer 32

The first dielectric layer 31 is provided to prevent oxidation of the recording layer, and protect the substrate by cutting off heat that may otherwise be conducted from the recording layer to the substrate during recording. The second dielectric layer 32 is provided to protect the recording layer, and control a release of remnant heat from the recording layer after the completion of recording. Both the dielectric layers also contribute to an improvement in the degree of modulation.

The first dielectric layer 31 comprises a dielectric layer 1a on its substrate 2 side and a dielectric layer 1b on its recording layer 4 side. The dielectric layer 1a comprises zinc sulfide and silicon oxide as main components. More exactly, the dielectric layer 1a contains silicon oxide in an amount of preferably 2 mol % to less than 40 mol %, and more preferably 10 mol % to 30 mol % inclusive. When the content of silicon oxide in the dielectric layer 1a is too high, any high C/N is hardly obtainable because of too low a refractive index. When the silicon oxide content is too low, on the other hand, the number of overwritable cycles is limited. The dielectric layer 1a may have either a homogeneous structure or a gradient composition profile wherein the silicon oxide content changes stepwise or continuously.

The dielectric layer 2b may comprise a metal nitride, or zinc sulfide and silicon oxide as main components. The metal nitride used herein, for instance, includes germanium nitride, silicon nitride, aluminum nitride, and titanium nitride. In the present invention, at least one of such metal nitrides may be used.

Of these metal nitrides, compound preferable for the main component of the dielectric layer 1b is germanium nitride or silicon nitride, and especially germanium nitride. Preferably but not exclusively, the germanium nitride used herein has a composition represented by $Ge_xN_{1-x}$ where x=0.35 to 0.55, and the silicon nitride used herein has a composition represented by $Si_xN_{1-x}$ where x=0.35 to 0.55. When the dielectric layer 1b comprises zinc sulfide and silicon oxide as main components, the content of silicon oxide is between 40 mol % and 80 mol %, and preferably between 40 mol % and 60 mol %. Too little silicon oxide renders it impossible to permit the dielectric layer 1b to act as a barrier layer, while too much makes recording impossible because the dielectric layer and recording layer are susceptible to exfoliation during initialization of the medium.

It is here to be noted that when the dielectric layer 1b comprises zinc sulfide and silicon oxide as main components, nitrogen may be introduced therein. The introduction of nitrogen in a mixture of zinc sulfide and silicon oxide enables the rate of crystallization to be increased, and so is effective for the case where it is desired to make the rate of crystallization high.

If required, the second dielectric layer 32 may have either a single-layer structure (see FIG. 1) or a multilayer structure (see FIG. 2). In either case, an area of the second dielectric layer 32 that is in contact with the recording layer 4, i.e., the whole of the second dielectric layer 32 in FIG. 1 or a dielectric layer 2a in FIG. 2 comprises a metal nitride, a rare earth oxide, silicon oxide, or zinc sulfide and silicon oxide as main components. The metal nitride used herein, for instance, includes germanium nitride, silicon nitride, aluminum nitride, and titanium nitride. For the second dielectric layer at least one of such metal nitrides may be used. Preferably, the second dielectric layer comprises germanium nitride and/or silicon nitride, or zinc sulfide and silicon oxide as main components. More preferably, the second dielectric layer is made up of germanium nitride or silicon nitride.

However, when the above area of the second dielectric layer 32 comprises zinc sulfide and silicon oxide as main components, the silicon oxide content is at least 40 mol %, preferably 40 to 80 mol %, and more preferably 40 to 60 mol %. At too low a silicon oxide content, the influence of diffusion of Zn, and S into the recording layer becomes noticeable. At too high a silicon oxide content, on the other hand, the second dielectric layer is susceptible to exfoliation during initialization or overwriting. When the main component of the area of the dielectric layer 32 that is in contact with the recording layer 4 is zinc sulfide, and silicon oxide, nitrogen may be introduced therein as in the case of the dielectric layer 1b.

In FIG. 2, it is to be noted that a dielectric layer 2b provided on the dielectric layer 2a may usually comprises zinc sulfide and silicon oxide as main components, although the present invention is not limited thereto. Preferably but not exclusively in this case, the content of silicon oxide is in the range of 2 mol % to less than 40 mol %.

No particular limitation is placed on the rare earth element used for the second dielectric layer 32, and so at least one element may be selected from Ce, La, Y, Pr, Nd, Pm, Sm, Eu, Gd, Tb, Dy, Ho, Er, Tm, Yb, Lu, etc. However, preference is given to using at least one of Ce, La, and Y.

In this regard, it is to be noted that the dielectric layer or layer containing silicone oxide should satisfy or preferably satisfies the aforesaid content of silicon oxide not only in terms of the average value but also throughout the layer or layer.

In the present disclosure, the content of silicon oxide is found by $SiO_2/(ZnS+SiO_2)$ with the proviso that zinc sulfide and silicon oxide are calculated as ZnS and $SiO_2$, respectively. Stated otherwise, the content of silicon oxide should be determined on the basis of the amount of S, Zn, and Si found as by fluorescent x-ray analysis. In this regard, for instance, when Zn is in excess of S or S is in excess of Zn, the content of silicon oxide should be calculated in conformity with the lesser of Zn and S on the premise that excessive Zn or S is present in the form of other compounds (ZnO, etc.) or in a free state.

In this connection, Japanese Patent Application No. 240514/1997 that was filed by the applicant but not laid open at the filing date of this application discloses an optical recording medium wherein:

$$Ac/Aa \geq 0.9,$$

the first, and second dielectric layers comprise zinc sulfide and silicon oxide as main components, while the first dielectric layer comprises a dielectric layer 1a on the substrate side and a dielectric layer 1b on the recording layer side, respectively, the dielectric layer 1a has a silicon oxide content of 2 to less than 40 mol %, the dielectric layer 1b has a silicon oxide content of 40 to 80 mol % inclusive, and the second dielectric layer has a silicon oxide content of 40 to 80 mol % inclusive, as found by $SiO_2/(ZnS+SiO_2)$ with the proviso that zinc sulfide and silicon oxide are calculated as ZnS and $SiO_2$, respectively, and the second dielectric layer has a thickness of 10 to 35 nm. Consequently, the scope disclosed in Japanese Patent Application No. 240514/1997 is excluded from the scope as recited in the appended claims.

The first dielectric layer 31 has a thickness of preferably 30 to 300 nm, and more preferably 50 to 250 nm. By allowing the first dielectric layer to have such a thickness, it is possible to achieve effective prevention of damage to the substrate during recording, with an increase in the degree of modulation.

The dielectric layer 1b has a thickness of preferably at least 0.5 nm, and more preferably at least 0.8 nm to ensure barrier performance. When the dielectric layer 1b comprises silicon nitride, its thickness should be less than 5 nm, and preferably not greater than 4 nm to prevent exfoliation in a high temperature and humidity environment. When the dielectric layer 1b comprises germanium nitride, on the other hand, its thickness can preferably be at least 5 nm to increase barrier performance because no exfoliation occurs even during storage in a high temperature and humidity environment. However, even when the dielectric layer 1b comprises germanium nitride, it is preferable that the upper limit to thickness is 40 nm, and optionally 30 nm. The dielectric layer 1b, when it has too large a thickness, makes no great contribution to the increase in the number of overwritable cycles. It is here to noted that when the dielectric layer 1b comprises a mixture of silicon nitride and germanium nitride, its thickness may be determined depending on the mixing ratio of both nitrides, etc.

The ratio of the thickness ($t_{1b}$) of the dielectric layer 1b to the thickness ($t_1$) of the first dielectric layer is preferably $t_{1b}/t_1 \leq 0.5$, and more preferably $t_{1b}/t_1 \leq 0.4$. When the ratio $t_{1b}/t_1$ is too large while the thickness of the dielectric layer 1b is in the aforesaid preferable range, the effect on the increase in the number of overwritable cycles becomes insufficient.

The second dielectric layer 32 has a thickness of 10 to 50 nm, and preferably 13 to 35 nm. By permitting the second dielectric layer to have such a thickness, the edges of recorded marks are so clearly delimited that the jitters can be minimized, because a fast cooling rate can be achieved. Such a thickness also contributes to an increase in the degree of modulation. It is to be noted that when the aforesaid area of the second dielectric layer that is in contact with the recording layer (for instance, the dielectric layer 2a in FIG. 2) has a thickness of preferably at least 1 nm, and more preferably at least 5 nm. When this area is too thin, the second dielectric layer 32 fail to serve well as a barrier layer.

Of the dielectric layers, those containing zinc sulfide should preferably contain a metal element A that has a standard free energy for the formation of a sulfide thereof lower than a standard free energy for the formation of ZnS at 0 to 1,000° C. By incorporating the metal element A in the dielectric layers, it is possible to prevent S and Zn releases therefrom upon repeated overwriting cycles, thereby preventing an increase in the jitters. This in turn ensures an increase in the number of overwritable cycles.

For the metal element A, it is preferable to use at least one element selected from the group consisting of Ce, Ca, Mg, Sr, Ba, and Na, with Ce being most preferable because of its low standard free energy for the formation of its sulfide. At 300° K, for instance, the standard free energy is ca. −230 kJ/mol for the formation of ZnS, ca. −540 kJ/mol for the formation of CeS, ca. −510 kJ/mol for the formation of CaS, ca. −390 kJ/mol for the formation of MgS, ca. −500 kJ/mol for the formation of SrS, ca. −460 kJ/mol for the formation of BaS, and ca. −400 kJ/mol for the formation of $Na_2S$.

In each or the dielectric layer, the ratio of the metal element A to all metal elements is less than 2 at %, preferably at most 1.5 at %, and more preferably at most 1.3 at %. Too much metal element A is substantially ineffective for prevention of jitter increases upon repeated overwriting cycles. To make full advantage of the metal element A added, it is preferred that the proportion of the metal element A is particularly at least 0.01 at %, and more particularly at least 0.03 at %. The ratio of the metal element A to all metal elements may be determined by fluorescent x-ray analysis, EPMA (electron probe x-ray microanalysis), or the like. In the present disclosure, all metals in the dielectric layer are understood to include metalloids such as Si.

In the dielectric layer, the metal element A may be present in the form of any of a single substance, sulfide, oxide, fluoride, etc.

Each dielectric layer is preferably formed by vapor phase growth processes such as sputtering, and evaporation, with sputtering being most preferred. The dielectric layer 1b may be formed by a sputtering process wherein, for instance, germanium nitride and/or silicon nitride are used as targets, and a reactive sputtering process wherein sputtering is carried out an a nitrogenous atmosphere while Si and/or Ge are used as targets.

To obtain a gradient composition structure by means of sputtering, for instance, use may be made of a multi-target sputtering process using a plurality of targets. In this process, the ratio of power inputs to the targets may be stepwise or continuously varied from the initial to final stage of film formation.

When a dielectric layer containing nitrogen in addition to zinc sulfide and silicon oxide is formed, no limitation is imposed on how to introduce nitrogen therein. For instance, when nitrogen is introduced in the second dielectric layer, it is preferable to use a process wherein, when the dielectric layer is formed by sputtering, $N_2$ gas is introduced in an atmosphere before or at the same time with the start of formation of the dielectric layer and the introduction of the $N_2$ gas is interrupted just after the start of formation of the dielectric layer, a process wherein $N_2$ gas is introduced in an atmosphere before or at the same time with the start of formation of the dielectric layer and the concentration of $N_2$ gas is lowered just after the start of formation of the dielectric layer, and a process wherein $N_2$ gas is continuously introduced in an atmosphere all the way while the dielectric layer is being formed. Apart from these processes, there are also available a process wherein the recording layer is formed by sputtering while $N_2$ gas is introduced in an atmosphere and the concentration of $N_2$ gas is increased just before the completion of formation of the recording layer, and a process wherein the second dielectric layer is formed on the recording layer after the recording layer has been formed and then subjected to a discharge treatment in an $N_2$ gas-containing atmosphere. Such processes may be used in combination of two or more. It is here to be noted that nitrogen may be introduced in the dielectric layer $1b$ according to the introduction processes explained in conjunction with the second dielectric layer.

When the nitrogen-containing dielectric layer is formed by sputtering, a gaseous mixture of an inert gas such as Ar and an $N_2$ gas is preferably introduced at a flow rate ($N_2$ gas/(Ar+$N_2$ gas) of 5 to 40%.

The incorporation of the metal element A in the dielectric layer may be achieved by various processes. When, for instance, Ce is used as the metal element A, the target used may comprise a major target providing a major component of the dielectric layer, on which a chip composed of Ce alone or $CeO_2$ is placed. Alternatively, $CeO_2$ or other Ce compound may be incorporated in the major target. In another target embodiment wherein Ca or Mg is used as the metal element A, a chip composed of CaO or MgO may be placed on the aforesaid major target to form a target body. However, this embodiment is not preferable because of the deliquescence of such compounds. Preferably in this case, therefore, a chip composed of $CaF_2$ or $MgF_2$ is placed on the major target to form a target body. When Sr, Ba or Na is used as the metal element A, too, it is preferable to use a fluoride chip rather than an oxide chip in view of deliquescence. Ca, Mg, Sr, Ba, and Na may be incorporated in the major target in the form of an oxide or other compound. It is to be noted that a composite target such as $ZnS\text{-}SiO_2$ may be used for the major target, or use may be made of a multi-target process wherein ZnS, and $SiO_2$ are independently used as the major target.

When the above metal element A is incorporated in the dielectric layer, it is preferable to carry out sputtering in an $Ar/O_2$ mixed atmosphere. The introduction of $O_2$ at the time of sputtering is particularly effective for carrying out sputtering while a chip composed of the metal element A alone is placed on the major target. This is also effective for the cases where a chip composed of a compound of the metal element A is placed on the major target, and a compound of the metal element A is incorporated in the major target. When the amount of $O_2$ incorporated in the sputtering atmosphere is represented by a flow ratio [$O2/(Ar+O_2)$], it is preferable that the flow ratio is in the range of 5 to 40%. The incorporation of too much $O_2$ is not preferable although it is possible to lower recording power. This is because the erase power margin becomes extremely narrow due to the erase power remaining unchanged.

Recording Layer 4

The recording layer is made up of a phase change type material, and no specific limitation is imposed on the composition of the recording layer. However, it is understood that the present invention is very effective for a phase change type of optical recording media having recording layers based on Ge—Sb—Te and In—Ag—Te—Sb compositions, especially Ge-Sb-Te compositions, as explained below.

In the present invention, the atomic ratio between elements constituting a recording layer based on the Ge—Sb—Te composition is given by formula I:

$$Ge_aSb_bTe_{1-a-b} \qquad (I)$$

Here it is preferable that $$0.08 \leq a \leq 0.25$$
$$0.20 \leq b \leq 0.40$$

When the value of a in formula I is too small, recorded marks are less susceptible to crystallization, resulting in an erasability drop. When the value of a is too large, much Te is bonded to Ge with the result that Sb is crystallized out, making the formation of recorded marks difficult.

When the value of b in formula I is too small, the amount of Te becomes too much during storage at high temperatures to achieve reliability, because recorded marks are susceptible to crystallization. When the value of b is too large, it is difficult to form recorded marks because of the crystallization of Sb.

The recording layer based on this composition has a thickness of preferably 10 to 50 nm. When the recording layer is too thin, the growth of a crystal phase becomes difficult, and so a reflectance change incidental to a phase change becomes insufficient. When the recording layer is too thick, on the other hand, there are drops of both reflectance and the degree of modulation.

In the present invention, the atomic ratio between elements constituting a recording layer based on the In—Ag—Te—Sb composition is given by formula II:

$$[(In_aAg_bTe_{1-a-b})_{1-c}Sb_c]_{1-d}M_d \qquad (II)$$

Here it is preferable that
a=0.1 to 0.3
b=0.1 to 0.3
c=0.5 to 0.8
d=0 to 0.10
It is more preferable that
a=0.11 to 0.28
b=0.15 to 0.28
c=0.55 to 0.78
d=0.005 to 0.05

When the value of a in formula II is too small, the In content of the recording layer becomes relatively too small. This in turn makes the amorphism of recorded marks insufficient, resulting in a drop of the degree of modulation, and a reliability drop as well. At too large a value of a, on the other hand, the In content of the recording layer becomes relatively too high. This in turn makes the reflectance of areas other than the recorded marks low, resulting in a drop of the degree of modulation.

When the value of b in formula II is too small, the Ag content of the recording layer becomes relatively too low. This in turn makes the recrystallization of recorded marks difficult and so renders repetitive overwriting difficult. At too large a value of b, on the other hand, the Ag content of the recording layer becomes relatively high, and so excessive Ag diffuses independently into an Sb phase at the time of recording or erasing. This in turn makes the robustness of the recording layer upon rewriting low, and renders the stability of both recorded marks and crystalline portions low, resulting a reliability drop. In other words, the crystallization of the recorded marks is promoted during storage at high temperatures, often resulting in drops of C/N and the degree of modulation. Repetition of recording may often facilitate deterioration in C/N and the degree of modulation.

When the value of a+b is too small, a Te phase is formed by excessive Te. The Te phase makes erasing difficult because it slows down the rate of crystal transition. When the value of a+b is too large, on the other hand, it is difficult to make the recording layer amorphous, leading to a possibility that signals may not be recorded.

When the value of c in formula II is too small, there is an increased reflectance difference concomitant with a phase change, but difficulty is involved in erasing because of an abrupt crystal transition rate drop. At too large a value of c, on the other hand, the degree of modulation becomes low due to a decreased reflectance difference incidental to the phase change.

In formula II, M represents at least one element selected from the group consisting of H, Si, C, V, W, Ta, Zn, Ti, Ce, Tb, Ge, Sn, Pb, and Y. The element M is effective for improving rewriting robustness, more specifically reducing the drop of erasability due to repetition of rewriting, and contributes to a reliability improvement under unfavorable conditions, e.g., high temperature and humidity conditions. Of these elements, it is preferable to use at least one of V, Ta, Ce, Ge and Y because their such effects are strong.

When the value of d representing the content of the element M is too large, no sufficient degree of modulation is obtainable because of a decreased reflectance difference concomitant with a phase change. When the value of d is too small, the effect of the element M added becomes slender.

It is preferred that the recording layer based on this composition consists essentially of Ag, Sb, Te and In, and the element or elements M added if required. In the practice of the present invention, however, it is acceptable that Ag may be partially replaced by Au, Sb may be partially replaced by Bi, Te may be partially replaced by Se, and In may be partially replaced by Al and/or P.

The percent replacement of Ag by Au is preferably up to 50 at %, and more preferably up to 20 at %. At too high a percent replacement, recorded marks are susceptible to crystallization, leading to a reliability drop at high temperatures.

The percent replacement of Sb by Bi is preferably up to 50 at %, and more preferably up to 20 at %. Too high a percent replacement causes the recording layer to have an increased coefficient of absorption, resulting in a reduction of the interference effect of light. This in turn makes the reflectance difference between crystalline and amorphous portions and hence the degree of modulation low, so failing to obtain high C/N.

The percent replacement of Te by Se is preferably up to 50 at %, and more particularly up to 20 at %. Too high a percent replacement causes the rate of crystal transition to become too low to obtain any sufficient erasability.

The percent replacement of In by Al and/or P is preferably up to 40 at%, and more preferably up to 20 at %. Too high a percent replacement causes the stability of recorded marks to become low with a reliability drop. It is to be noted that Al and P may be used at any desired proportion.

In connection with this composition system, it is to be noted that the absorption coefficient, k, of the recording layer after repeated rewriting is about 3.3 in a crystallographic state, and about 2.2 in a microcrystalline or amorphous state.

The recording layer based on the aforesaid composition has a thickness of preferably 9.5 to 50 nm, and more preferably 13 to 30 nm. Too thin a recording layer makes the growth of a crystal phase difficult, and so renders a reflectance change incidental to a phase change insufficient. Too thick a recording layer, on the other hand, causes a large amount of Ag to diffuse in the recording layer in a thickness direction thereof during the formation of recorded marks. This in turn makes the proportion of Ag diffusing in a longitudinal direction of the recording layer low, resulting in a drop of the reliability of the recording layer. Too thick a recording layer gives rise to drops of both reflectance and the degree of modulation.

The composition of the recording layer may be determined by EPMA, x-ray microanalysis, ICP, or the like.

Preferably, the recording layer is formed by sputtering. Sputtering conditions are not critical to the practice of the present invention. For instance, an alloy target or a multi-target sputtering process with a plurality of targets may be used for the sputtering of a material comprising a plurality of elements.

Reflective Layer 5

The reflective layer 5 is preferably made up of either an extremely thin metal layer having high light transmittance or a material such as silicon, and germanium, which has high transmitivity in a near-infrared or infrared region including recording/reproducing wavelengths. The thickness of the reflective layer may be properly determined so as to make correction for the absorptance difference between recorded mark spots and other spots in the recording layer. A preferable thickness of the reflective layer varies largely depending on its constituting material, and so may be properly determined depending on the constituting material. For instance, the reflective layer may have a thickness of preferably at most 40 nm, and more preferably 10 to 30 nm when it is made up of Au or other metal, and a thickness of preferably at most 80 nm, and more preferably 30 to 70 nm when it is made up of Si or Ge. Too thin a reflective layer gives rise to a C/N drop whereas too thick a reflective layer has an unsatisfactory effect on the aforesaid correction of absorptance.

When the reflective layer is made up of a metal, it is preferable to use Au or an Au alloy. For the Au alloy, it is preferable to use alloys composed mainly of Au and containing at least one elements of Al, Cr, Cu, Ge, Co, Ni, Mo, Ag, Pt, Pd, Ta, Ti, Bi, and Sb.

Preferably, the reflective layer is formed by vapor phase growth processes such as sputtering or evaporation.

Third Dielectric Layer 33

Preferably, the third dielectric layer 33 is made up of a material having a refractive index higher than that of the protective layer 6. The third dielectric layer 33 is not essential to the practice of the invention. However, if the third dielectric layer is provided, it is then possible to keep the aforesaid Ac/Aa large while the reflectance difference between the recorded marks and other spots is kept large, as in the case of the invention set forth in JP-A 8-124218.

Preferably, the third dielectric layer comprises ZnS and $SiO_2$ as main components, although this layer may be made up of a material selected from other various oxides and nitrides, or their mixtures.

The third dielectric layer has a thickness of preferably 30 to 120 nm, and more preferably 40 to 90 nm. When the third dielectric layer is too thin, there is a signal output drop whereas when it is too thick, there is a (cross erase) phenomenon wherein signals on adjacent tracks are erased.

Protective layer 6

The protective layer is provided to improve scratch resistance, and corrosion resistance. Preferably, this protective layer is made up of various organic materials. However, particular preference is given to constructing the protective layer of a radiation-curing type compound or a composition thereof, which is cured with radiation such as electron beams or ultraviolet rays. The protective layer has usually a thickness of about 0.1 to 100 μm, and may be formed by ordinary processes such as spin coating, gravure coating, spray coating, and dipping.

Adhesive Layer

Adhesives that form the adhesive layer may be not particularly critical, and so may be selected from hot-melt adhesives, ultraviolet-curing adhesives, cold-setting adhesives, tackifiers, etc.

Recording/Reproducing Process

The optical recording medium of the invention may be overwritten as is the case with a prior art phase change type of optical recording medium.

It is here to be noted that recording power, and erase power is usually selected from the ranges of about 9 to 12 mW, and about 4 to 6 mW, respectively, although they may be properly determined depending on the composition of the recording layer, the linear speed of the medium, etc.

When the optical recording medium of the invention is overwritten, no particular limitation is imposed on the linear velocity of the recording layer with respect to a laser beam. When the recording layer has the aforesaid composition, however, its linear velocity is usually about 0.8 to 20 m/s, and preferably 1.2 to 16 m/s.

Insofar as the optical recording medium of the invention comprising the recording layer having the above composition is concerned, the light used for rewriting or reproduction may be freely selected from a wide wavelength region, for instance, from the range of 100 to 5,000 nm.

EXAMPLE

The present invention is now explained more specifically with reference to some examples.

The first dielectric layer 31, recording layer 4, second dielectric layer 32, reflective layer 5, third dielectric layer 33 and protective layer 6 were formed on a surface of a disk form of polycarbonate substrate 2 of 120 mm in diameter and 0.6 mm in thickness in the following procedures. The substrate 2 was also provided with grooves (of 0.60 μm in width, 50 nm in depth and 1.20 μm in pitch) by injection molding. In this way, optical recording disk samples having such structures as shown in FIGS. 1, and 2 were prepared.

The composition and thickness of each of the dielectric laminae forming the first dielectric layer 31, and the second dielectric layer 32 are shown in Table 1. The composition and thickness of the first dielectric layer, when it has a single-layer structure, are shown in the column regarding the dielectric layer 1a in Table 1, and the composition and thickness of the second dielectric layer, when it has a single-layer structure, are shown in the column regarding the dielectric layer 2a in Table 1. Some dielectric layers comprising $ZnS-SiO_2$ were formed by a sputtering process in an Ar atmosphere, and some dielectric layers comprising $Si_3N_4$ or $Ge_3N_4$ were formed by a reactive sputtering process in an Ar atmosphere containing nitrogen, using an Si target and a Ge target, respectively.

The recording layer 4 was formed by a sputtering process in an Ar atmosphere, using $Ge_{21}Sb_{25}Te_{54}$ (atomic ratio) for the target. The recording layer 4 had a thickness of 14 nm.

The reflective layer 5 was formed by a sputtering process in an Ar atmosphere. For the target, Si was used. The thickness of the reflective layer was 50 nm.

The third dielectric layer 33 was formed by a sputtering process in an Ar atmosphere. For the target, ZnS (85 mol %)—$SiO_2$ (15 mol %) was used. The thickness of the third dielectric layer was 60 nm.

The protective layer 6 was formed by the spin coating of an ultraviolet-curing resin, followed by curing the resin by ultraviolet irradiation. Upon curing, the protective layer had a thickness of 5 μm.

The recording layer of each of the thus prepared samples was initialized in a solid-phase state, using a bulk eraser. The post-initialization grain size of the recording layer was about 100 nm. After initialization, the sample, from which the protective layer 6 was removed, was irradiated from the side of the substrate 2 with a laser beam of 680 nm wavelength to measure the transmittance of the recording layer in a mirror (crystalline) region, using a spectrophotometer. The transmittance was then 5% or greater. It is here to be noted that the Ac/Aa of each sample at 680 nm wavelength is 0.9 or greater. The properties of each sample were estimated by placing the sample on an optical recording medium-estimating device (operating at a wavelength of 680 nm, a numerical aperture NA of 0.6 and a linear speed of 12 m/s), and repeatedly overwriting it with 1-7RLL signals. The recording power was 10 mW, and the erase power was 5 mW. The number of overwritable cycles for each sample is shown in Table 1. The number of overwritable cycles referred to herein is the maximum number of overwritable cycles wherein the bit error rate (BER) is $3.0 \times 10^{-6}$ or lower.

Using the fact that a large reflectance change was observed upon exfoliation of the first dielectric layer, whether or not exfoliation occurred was estimated from the reflectance change after each sample was stored for 50 hours in a 60° C. and 80% RH environment. The results are shown in Table 1.

TABLE 1

| | | Dielectric layer 1a | | Dielectric layer 1b | | Dielectric layer 2a | | Dielectric layer 2b | | Number of overwritable cycles | Exfoliation of dielectric layer |
|---|---|---|---|---|---|---|---|---|---|---|---|
| No. | | $ZnS:SiO_2$ (mol %) | Thickness (nm) | Composition (mol %) | Thickness (nm) | Composition (mol %) | Thickness (nm) | $ZnS:SiO_2$ (mol %) | Thickness (nm) | | |
| 1 | comp. | 85:15 | 200 | — | — | $ZnS:SiO_2$ (85:15)* | 15 | — | — | 1,000 | not found |
| 2 | | 85:15 | 195 | $Si_3N_4$ (100) | 5 | $Si_3N_4$ (100) | 15 | — | — | 500,000 | found |
| 3 | | 85:15 | 197 | $Si_3N_4$ (100) | 3 | $Si_3N_4$ (100) | 15 | — | — | 500,000 | not found |
| 4 | | 85:15 | 199 | $Si_3N_4$ (100) | 1 | $Si_3N_4$ (100) | 15 | — | — | 300,000 | not found |
| 5 | | 85:15 | 199 | $Si_3N_4$ (100) | 1 | $ZnS:SiO_2$ (50:50) | 15 | — | — | 100,000 | not found |

TABLE 1-continued

| No. | | Dielectric layer 1a ZnS:SiO$_2$ (mol %) | Thickness (nm) | Dielectric layer 1b Composition (mol %) | Thickness (nm) | Dielectric layer 2a Composition (mol %) | Thickness (nm) | Dielectric layer 2b ZnS:SiO$_2$ (mol %) | Thickness (nm) | Number of overwritable cycles | Exfoliation of dielectric layer |
|---|---|---|---|---|---|---|---|---|---|---|---|
| 6 | comp. | 85:15 | 199 | Si$_3$N$_4$ (100) | 1 | ZnS:SiO$_2$ (85:15)* | 15 | — | — | 5,000 | not found |
| 7 | | 85:15 | 195 | Ge$_3$N$_4$ (100) | 5 | Si$_3$N$_4$ (100) | 15 | — | — | 500,000 | not found |
| 8 | | 85:15 | 190 | Ge$_3$N$_4$ (100) | 10 | Si$_3$N$_4$ (100) | 15 | — | — | 500,000 | not found |
| 9 | | 85:15 | 180 | Ge$_3$N$_4$ (100) | 20 | Si$_3$N$_4$ (100) | 15 | — | — | 500,000 | not found |
| 10 | | 85:15 | 190 | Ge$_3$N$_4$ (100) | 10 | Ge$_3$N$_4$ (100) | 15 | — | — | 500,000 | not found |
| 11 | | 85:15 | 199 | Si$_3$N$_4$ (100) | 1 | Si$_3$N$_4$ (100) | 5 | 85:15 | 10 | 300,000 | not found |
| 12 | | 85:15 | 180 | ZnS:SiO$_2$ (50:50) | 20 | Si$_3$N$_4$ (100) | 15 | — | — | 50,000 | not found |

*Outside from the inventive scope

Table 1 clarifies the effectiveness of the invention. That is, the samples of the invention are all overwritable at least 50,000 times, and most of them are overwritable 100,000 times or more. However, sample No. 1 wherein the first and second dielectric layers, each having a ZnS-SiO$_2$ content of 15 mol %, are used, and sample No. 6 wherein the second dielectric layers having a ZnS-SiO$_2$ content of 15 mol % is used are found to be noticeably reduced in the number of overwritable cycles. If, in the invention, the dielectric layer 1b is made up of silicone nitride and used at a thickness of less than 5 nm, then the dielectric layer does not exfoliate even during storage in a high temperature and humidity environment.

Japanese Patent Application No. 9-364541 and New Japanese Patent Application filed on Nov. 17, 1998 are herein incorporated by reference.

Although some preferred embodiments have been described, many modifications and variations may be made thereto in the light of the above teachings. It is therefore to be understood that within the scope of the appended claims, the invention may be practiced otherwise than as specifically described.

What we claim is:

1. An optical recording medium comprising a phase change type recording layer, a first dielectric layer that is in contact with a lower side of said recording layer and a second dielectric layer that is in contact with an upper side of said recording layer, in which:

Ac/Aa≧0.8 wherein upon incidence of a recording/reproducing laser beam from said first dielectric layer on said recording layer, Ac is an absorption coefficient of said recording layer in a crystalline region and Aa is an absorption coefficient of said recording layer in an amorphous region, and said first dielectric layer comprises a dielectric layer 1a that is spaced away from said recording layer and a dielectric layer 1b that is in contact with said recording layer, said dielectric layer 1a comprising zinc sulfide and silicon oxide as main components, said dielectric layer 1b comprising a metal nitride or zinc sulfide and silicon oxide as main components, with the proviso that when said dielectric layer 1b comprises zinc sulfide and silicon oxide as said main components, said dielectric layer 1b has a silicon oxide content of 40 to 80 mol % as found by [SiO$_2$/(ZnS+SiO$_2$)] provided that zinc sulfide and silicon oxide are calculated as ZnS and SiO$_2$, respectively, and an area of said second dielectric layer that is in contact with said recording layer comprising a metal nitride, a rare earth oxide, silicon oxide, or zinc sulfide and silicon oxide as main components, with the proviso that when said area comprises zinc sulfide and silicon oxide as said main components, said area has a silicon oxide content of at least 40 mol % as found by [SiO$_2$/(ZnS+SiO$_2$)] provided that zinc sulfide and silicon oxide are calculated as ZnS and SiO$_2$, respectively, with the proviso that precluded from said optical recording medium is an optical recording medium wherein:

said first dielectric layer, and said second dielectric layer comprises zinc sulfide and silicon oxide as main components, said dielectric layer 1a has a silicon oxide content of 2 mol % to less than 40 mol %, said dielectric layer 1b has a silicon oxide content of 40 to 80 mol % inclusive, said second dielectric layer has a silicon oxide content of 40 to 80 mol % inclusive, and said second dielectric layer has a thickness of 10 to 35 nm.

2. The optical recording medium according to claim 1, wherein at least one of said area of said second dielectric layer that is in contact with said recording layer and said dielectric layer 1b comprises germanium nitride and/or silicon nitride as said main components.

3. The optical recording medium according to claim 2, wherein said dielectric layer 1b comprises germanium nitride as a main component, and has a thickness of 0.5 to 40 nm inclusive.

4. The optical recording medium according to claim 2, wherein said dielectric layer 1b comprises silicon nitride, and has a thickness of 0.5 nm to less than 5 nm.

5. The optical recording medium according to claim 1, wherein said dielectric layer 1a has a silicon oxide content of 2 mol % to less than 40 mol % as found by [SiO$_2$/(ZnS+SiO$_2$)] provided that zinc sulfide and silicon oxide are calculated as ZnS and SiO$_2$, respectively.

6. The optical recording medium according to claim 1, wherein said second dielectric layer has a reflective layer thereon, said reflective layer comprising a metal and having a thickness of up to 40 nm or comprising silicon or germanium and having a thickness of at most 80 nm.

7. The optical recording medium according to claim 6, wherein said reflective layer has said third dielectric layer thereon.

* * * * *